US012611598B2

(12) United States Patent
Shimizu et al.

(10) Patent No.: US 12,611,598 B2
(45) Date of Patent: Apr. 28, 2026

(54) ELECTRONIC DEVICE AND NON-TRANSITORY COMPUTER-READABLE STORAGE MEDIUM HAVING ELECTRONIC DEVICE CONTROL PROGRAM STORED THEREIN

(71) Applicant: NINTENDO CO., LTD., Kyoto (JP)

(72) Inventors: Hideaki Shimizu, Kyoto (JP); Tomoaki Yoshinobu, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 505 days.

(21) Appl. No.: 17/406,391

(22) Filed: Aug. 19, 2021

(65) Prior Publication Data

US 2022/0355197 A1     Nov. 10, 2022

(30) Foreign Application Priority Data

May 7, 2021     (JP) .................................. 2021-079216

(51) Int. Cl.
    *A63F 13/92*        (2014.01)
    *A63F 13/422*       (2014.01)
    *A63F 13/46*        (2014.01)

(52) U.S. Cl.
    CPC ............ *A63F 13/422* (2014.09); *A63F 13/46* (2014.09); *A63F 13/92* (2014.09); *A63F 2300/638* (2013.01)

(58) Field of Classification Search
    None
    See application file for complete search history.

(56) References Cited

U.S. PATENT DOCUMENTS 9,782,677  B1 *  10/2017  Topkins ................ A63F 13/825
10,744,408 B2 *  8/2020   Ohara ..................... A63F 13/30

2005/0096131  A1 *  5/2005   Ouchi ..................... A63F 13/44
                                                            463/31
2005/0255923  A1 *  11/2005  Aoki ....................... A63F 13/35
                                                            463/43
2006/0227105  A1 *  10/2006  Kogo ..................... G06F 3/023
                                                            345/156
2008/0146328  A1 *  6/2008   Ishii ........................ A63F 13/56
                                                            463/31
2008/0303790  A1 *  12/2008  Morimoto ............. A63F 13/577
                                                            345/157
2009/0082112  A1 *  3/2009   Itskov .................... A63F 13/46
                                                            463/42

(Continued)

FOREIGN PATENT DOCUMENTS

JP          3040174         8/1997
JP          2017-148482     8/2017
WO          WO-9635491  A1 *  11/1996   ........... A63F 13/573

OTHER PUBLICATIONS

Weland1995, New Super Mario Bros. U Boost Mode Challenges All Gold Medals, Feb. 10, 2013, https://www.youtube.com/watch?v=xL2zwXVPmas , p. 1 (Year: 2013).*

(Continued)

*Primary Examiner* — Tramar Harper
(74) *Attorney, Agent, or Firm* — Nixon & Vanderhye PC

(57)     ABSTRACT

A timer period is set on the basis of a user input, and counting processing of counting a time is executed during the timer period. During the timer period, game processing including control of a virtual object is executed. A count image indicating a state of the counting and a game image by the game processing are outputted to a display unit. Here, during the game processing, the control of the virtual object is switched between manual control based on a user input and automatic control that is not based on the user input.

16 Claims, 14 Drawing Sheets

(56)     References Cited

U.S. PATENT DOCUMENTS

| | | | |
|---|---|---|---|
| 2011/0201395 A1* | 8/2011 | Bansi ................. | A63F 13/5375 |
| | | | 463/6 |
| 2013/0165229 A1* | 6/2013 | Park ................... | G07F 17/3225 |
| | | | 463/40 |
| 2015/0190718 A1* | 7/2015 | Ohta ....................... | A63F 13/67 |
| | | | 463/31 |
| 2016/0256777 A1* | 9/2016 | Umebayashi ......... | A63F 13/537 |
| 2019/0366221 A1* | 12/2019 | Suzuki ................... | A63F 13/88 |
| 2021/0093970 A1* | 4/2021 | Takahashi ............. | A63F 13/537 |
| 2021/0268377 A1* | 9/2021 | Hamaguchi ......... | A63F 13/5252 |

OTHER PUBLICATIONS

Sixfortyfive, New Super Mario Bros. U—Gold Medal replays for all 80 Challenges, Nov. 26, 2012, https://www.youtube.com/watch?v=9Tf4WvCLgOs , p. 1 (Year: 2012).*

Typhlosion4President, New Super Mario Bros U Walkthrough—Part 1—World 1 Acorn Plains, Jul. 12, 2015, https://www.youtube.com/watch?v=V7fzSIEOSmQ&list=PLDM0SB6H6DklxDUB3mnJ7qr6tRe4JA3s5 , p. 1 (Year: 2015).*

Wikipedia, Wii U, Oct. 29, 2013, https://web.archive.org/web/20131029034418/https:/en.wikipedia.org/wiki/Wii_U , pp. 1-24 (Year: 2013).*

Hi Tech Hero, Wii U New Super Mario Bros U Controller Gameplay Hd, Jan. 7, 2013, https://www.youtube.com/watch?v=vTiY43O2hLc , time 0:00-6:11 , p. 1 (Year: 2013).*

Internet Archive, Crazy Taxi 3: High Roller—Microsoft Xbox—Manual, Jan. 6, 2021, https://archive.org/details/manualzz-id-990986/page/n15/mode/2up , pp. 1-24 embedded in webpage, p. 1 (Year: 2021).*

Office Action for Japanese Patent Application No. 2021-079216 dated Jul. 25, 2023, 7 pages.

Notice of Reasons for Refusal for Japanese Patent Application No. 2021-079216 dated Feb. 14, 2023, 6 pages (with translation).

* cited by examiner

| STAGE NUMBER | TIMER PERIOD | HIGH SCORE VALUE |
|---|---|---|
| | 4061 | 4062 | 4063 |
| STAGE 1 | 1 MINUTE | 030 |
| | 2 MINUTES | 060 |
| | ⋮ | ⋮ |
| | 10 MINUTES | 140 |
| STAGE 2 | 1 MINUTE | 020 |
| | 2 MINUTES | 043 |
| | ⋮ | ⋮ |
| | 10 MINUTES | 150 |
| STAGE 3 | 1 MINUTE | 033 |
| | 2 MINUTES | 051 |
| | ⋮ | ⋮ |
| | 10 MINUTES | 180 |

ELECTRONIC DEVICE AND NON-TRANSITORY COMPUTER-READABLE STORAGE MEDIUM HAVING ELECTRONIC DEVICE CONTROL PROGRAM STORED THEREIN

CROSS REFERENCE TO RELATED APPLICATION

This application claims priority to Japanese Patent Application No. 2021-79216 filed on May 7, 2021, the entire contents of which are incorporated herein by reference.

FIELD

The present disclosure relates to an electronic device including a user input unit, a display unit, and a processor, and a non-temporary computer-readable storage medium having an electronic device control program stored therein.

BACKGROUND AND SUMMARY

Conventionally, an LCD game machine that interrupts execution of a game program and emits an alarm sound when a setting time of an alarm has come during the execution of the game program, has been known.

The above LCD game machine merely provides an alarm function of, when a predetermined set time has come, interrupting game processing and notifying the arrival of the time by an alarm sound or the like, so that there is room for improvement in integration of a game function and an alarm function related to time.

Therefore, it is an object of the present disclosure to provide an electronic device and a non-temporary computer-readable storage medium having an electronic device control program stored therein, in which a game function and an alarm function related to time are integrated.

In order to attain the object described above, for example, the following configuration examples are exemplified.

A configuration example is directed to an electronic device comprising at least one user input unit, at least one display unit, and at least one processor. The processor is configured to: set a timer period on the basis of a first user input on the user input unit; execute counting processing of counting a time, during the timer period; execute game processing including control of a virtual object, from start of the counting in the timer period to end of the counting; output a count image indicating a state of the counting by the counting processing and a game image by the game processing to the display unit; and switch the control of the virtual object between manual control based on a second user input on the user input unit and automatic control in which control is performed without being based on the second user input, during the game processing.

According to the above configuration example, it is possible to provide an electronic device that provides entertainment characteristics as a game even during a timer period. In addition, in the game, it is also possible to switch between manual control and automatic control. Accordingly, the user can wait for the end of the timer period while playing the game, or, even when the user does not perform a direct operation, the user can wait for the end of the timer period while watching the game that proceeds through the automatic control. Moreover, since the game ends with the end of the timer period, it is possible to prevent a situation in which the user is conscious of a continuation or the like of the game after the end of the timer period and therefore the execution of other work is hindered.

In another configuration example, the processor may be configured to switch the control of the virtual object to the automatic control if there is no specific user input for a predetermined time or longer while the virtual object is controlled through the manual control.

According to the above configuration example, even if the user has to let go during the timer period, the control is switched to the automatic control, so that the game can proceed. Therefore, as the timer period proceeds, the game image can continue to entertain the user.

In another configuration example, the processor may be configured to switch the control of the virtual object to the manual control if a specific user input is performed while the virtual object is controlled through the automatic control.

According to the above configuration example, it is possible to switch between the manual control and the automatic control by a simple operation, so that the convenience of the user can be improved.

In another configuration example, the processor may be configured to: calculate a score that is a value obtained by scoring a result of predetermined processing performed in the game processing; and store a high score in a memory for each timer period.

According to the above configuration example, it is possible to provide a game element/repeatedly-playing element of competing for a high score for each timer period, to the user, so that the entertainment characteristics of the game can be further enhanced.

In another configuration example, the processor may be configured to: select one game from among a plurality of types of games prepared, on the basis of a fourth user input, and execute the game processing related to the selected game; and store the high score in the memory for each of the types of games and the timer period.

According to the above configuration example, even if a specific timer period is used more often, it is possible to provide the fun of competing for high scores in different game stages, to the user. Accordingly, the entertainment characteristics of the timer in a wait time can be enhanced.

In another configuration example, the processor may be configured to set the timer period in any of units of 1 minute, units of 30 seconds, and units of 10 seconds.

According to the above configuration example, it is possible to achieve both the function as a timer and the function as a game in which a high score is recorded. In addition, a high score can be recorded in a unit period that is long to some extent. In this regard, if a high score is recorded in a unit period that is very short such as in units of a few seconds, it may be annoying to the user. However, by making it possible to set a timer period in a unit period that is long to some extent, it is possible to reduce the possibility of making the user feel such annoyance.

In another configuration example, the processor may be configured to calculate the score or while the user object is controlled through the manual control or even while the user object is controlled through the automatic control.

According to the above configuration example, even during the automatic control in which the user does not directly operate the user object, addition to the score is performed. Accordingly, while the user is manually operating the user object, if the user desires to stop the manual operation or if the need to interrupt the manual operation arises, the psychological resistance to stopping playing the game through manual operation can be reduced. In addition, since addition to the score is performed even if the user does not directly operate the user object, the entertainment characteristics of the game can be maintained.

In another configuration example, the processor may be further configured to: restrict a user input for operating the virtual object, from a predetermined time before the counting in the timer period ends; and, when the counting in the timer period ends, execute displaying a predetermined representation accompanying the end.

According to the above configuration example, it is possible to present a stable end representation that does not depend on the game status at the timing of the end of the timer period. Accordingly, the user can be reliably caused to recognize that the timer period has ended.

In another configuration example, the electronic device may be an electronic device having a clock function.

According to the above configuration example, it is possible to provide a new clock (clock product) that has never existed before, such as a clock having a timer function with a game.

In another configuration example, while the electronic device is functioning as a clock, the electronic device may shift to a sleep mode if a predetermined time elapses, and when the processor executes the counting processing, the electronic device may not necessarily shift to the sleep mode even if the predetermined time elapses.

According to the above configuration example, a display showing the passage of the timer period can be continuously displayed, so that the user is allowed to easily check the passage of time.

In another configuration example, after the counting in the timer period ends, the electronic device may not necessarily shift to the sleep mode until a predetermined input is performed.

According to the above configuration example, the user is more reliably caused to recognize the passage and the end of the timer period.

In another configuration example, while the electronic device is functioning as a clock, the electronic device may shift to the sleep mode if a first predetermined time elapses, and while the electronic device is not functioning as a clock, after the processor ends the counting processing, the electronic device may shift to the sleep mode if a second predetermined time longer than the first predetermined time elapses.

According to the above configuration example, it is possible to increase the possibility that the user will notice that the timer period has ended.

In another configuration example, the electronic device may be able to execute other game processing that is executable without setting the timer period and that is processing different from the executed game processing, and image data to be used in the game processing may be the same as image data to be used in the other game processing.

According to the above configuration example, the storage capacity of the electronic device in which a predetermined game is installed can be reduced.

According to the exemplary embodiments, it is possible to provide an electronic device that can provide entertainment characteristics as a game during a timer period.

BRIEF DESCRIPTION OF THE DRAWINGS

FIG. 14 illustrates a non-limiting example of the data structure of high score data 406;

DETAILED DESCRIPTION OF NON-LIMITING EXAMPLE EMBODIMENTS

[Hardware Configuration of Information Processing Terminal]

Figure 1:
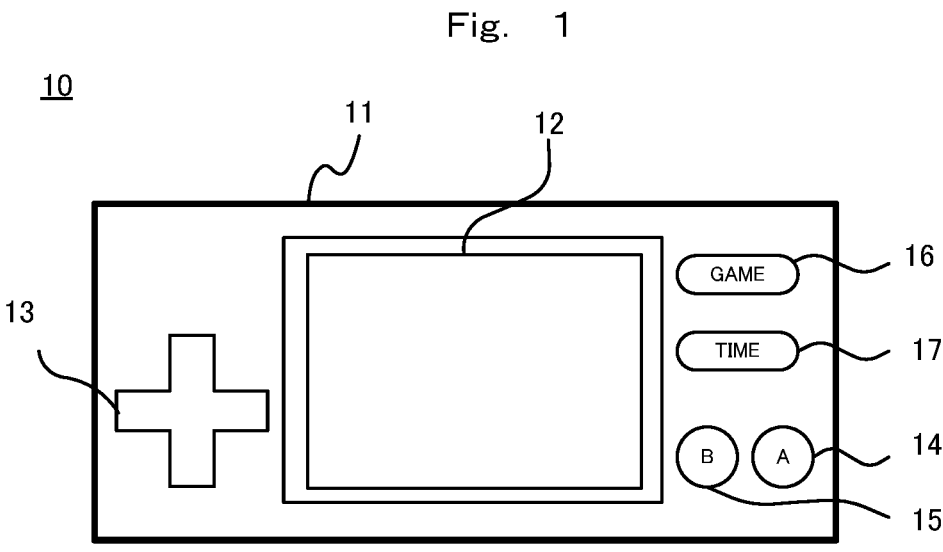
FIG. 1 is a schematic diagram showing a non-limiting example of the outer appearance of an electronic device 10 according to an embodiment.

Hereinafter, an exemplary embodiment will be described. It is to be understood that, as used herein, elements and the like written in singular form with a word "a" or "an" attached before them do not exclude those in the plural form. FIG. 1 is a view showing the outer appearance of an electronic device 10 in which processing is executed in the exemplary embodiment. The electronic device 10 includes a substantially plate-shaped housing 11. In the exemplary embodiment, the main surface of the housing 11 (in other words, the front surface on which a display 12 is provided) roughly has a rectangular shape. It is noted that the shape and the size of the housing 11 may be optionally set. As an example, the housing 11 may have a portable size.

As shown in FIG. 1, the electronic device 10 includes the display 12 provided on the main surface of the housing 11. The display 12 displays an image generated by the electronic device 10. In the exemplary embodiment, the display 12 is a liquid crystal display (LCD). However, the display 12 may be any type of display device.

On the main surface of the housing 11, a plurality of operation keys (an operation unit 104 described later) are provided. Specifically, a cross key 13, an A button 14, a B button 15, a first mode switch button 16, and a second mode switch button 17 are provided.

Figure 2:
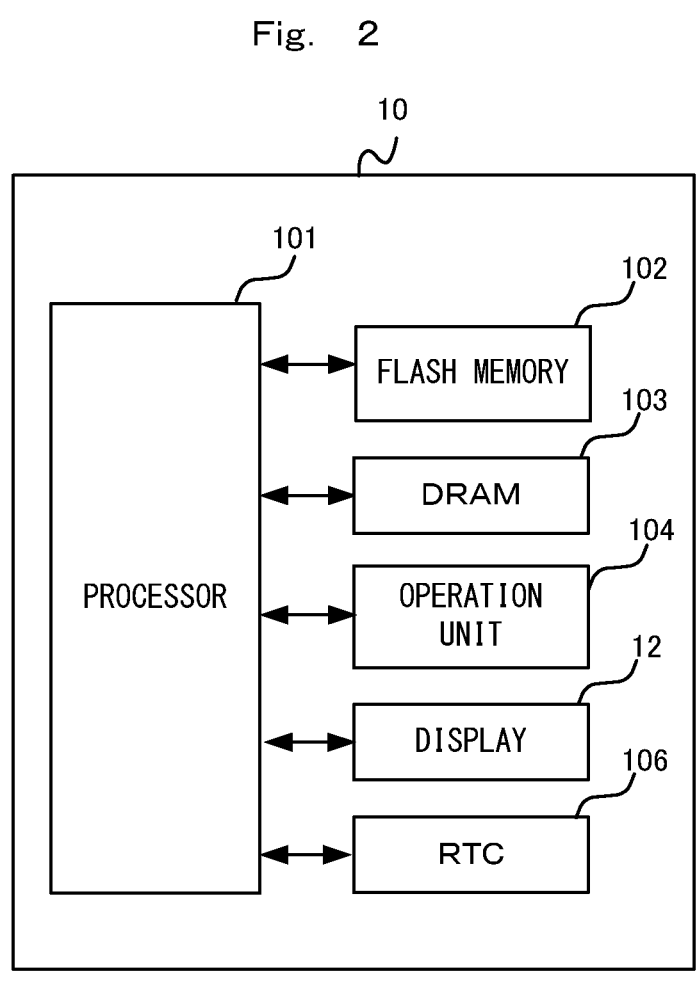
FIG. 2 is a block diagram showing a non-limiting example of the hardware configuration of the electronic device 10.

Next, the hardware configuration of the electronic device 10 will be described. FIG. 2 is a block diagram showing the hardware configuration of the electronic device 10. In FIG. 2, the electronic device 10 includes a processor 101, a flash memory 102, a DRAM 103, an operation unit 104, the display 12, and a real time clock (hereinafter, RTC) 106. The processor 101 executes various processes as described later. As the processor 101, a single processor may be mounted or a plurality of processors may be mounted. The flash memory 102 stores various programs to be executed by the processor 101 and various data to be used on the programs. The DRAM 103 is a memory for storing game data generated through game processing as necessary. In this example, when processing in the exemplary embodiment is actually executed, various programs and data in the flash memory 102 are copied (loaded) onto the DRAM 103. In execution of processing described below, basically, programs and data copied onto the DRAM 103 are used. A part of an area of the DRAM 103 is used also as a VRAM.

Next, the operation unit 104 is an input device for receiving an operation from a user, and corresponds to the plurality of operation keys described above. The RTC 106 provides a clock function and/or a timing function, and the processor 101 can acquire the present time or the like from the RTC 106.

[Outline of Functions of Electronic Device]

Figure 3:
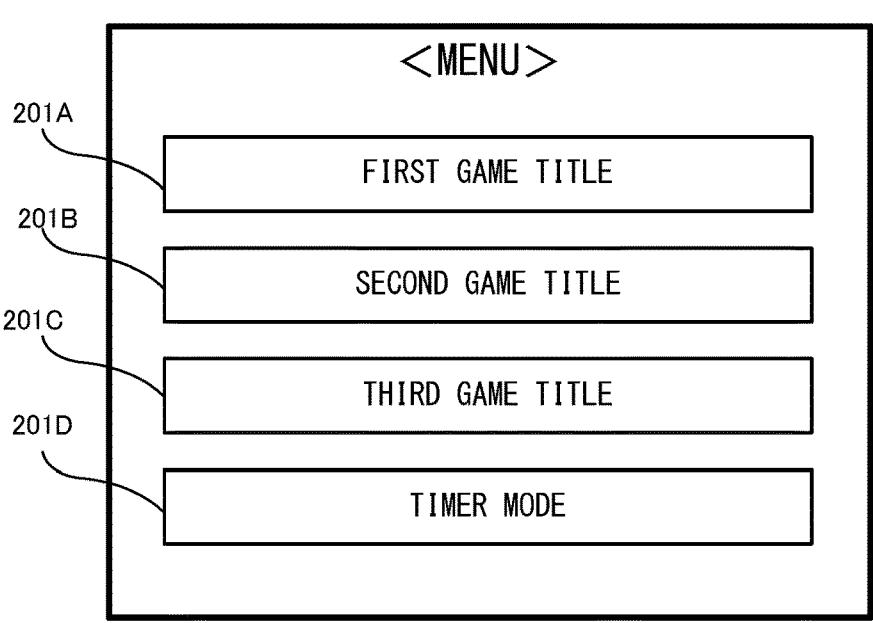
FIG. 3 illustrates a non-limiting example of a menu screen.

Next, the outline of the functions of the electronic device 1 according to the exemplary embodiment will be described. In the exemplary embodiment, the electronic device 10 functions as a clock. In addition, the electronic device 10 also functions as a game apparatus. Specifically, when the second mode switch button 17 is pressed, the time is displayed on the display 12, and the user can use the electronic device 10 as a clock. That is, in this case, the electronic device 10 functions as a clock (this state is referred to as a clock mode). In addition, when the first mode switch button 16 is pressed, a menu screen is displayed on the display 12 as shown in FIG. 3. In the menu screen shown in FIG. 3, four choice buttons 201A to 201D are displayed. Here, three types of games are pre-installed in the electronic device 10. When the user selects and operates any of the choice buttons 201A to 201C, the user can play a game corresponding to the operated choice button 201. In this case, the electronic device 10 functions as a game apparatus corresponding to these games. Furthermore, when the user selects the choice button 201D, the user can cause the electronic device 10 to function as a "timer". Processing described in the exemplary embodiment is processing related to the timer. Hereinafter, a state where the electronic device 10 functions as a timer is referred to as a "timer mode". In the exemplary embodiment, it is assumed that a timer for up to 10 minutes can be set.

[Outline of Processing of Exemplary Embodiment]

Next, the outline of processing assumed in the timer mode of the exemplary embodiment will be described. In the processing assumed in the exemplary embodiment, a timer period is set, and, in a period from the start of time counting to the end of the counting (hereinafter, referred to as a counting period), predetermined game processing is executed in a screen in which the timer is displayed. In other words, the processing provides a "game with a timer" and a "timer with a game" to the user. Hereinafter, an example of operation in the timer mode will be described using screen examples. In the exemplary embodiment, the case of counting down will be described as an example of the above time counting. In another exemplary embodiment, counting up may be performed. In addition, in the following description, the terms "game" and "game processing" merely refer to a game and game processing executed in the timer mode unless otherwise specified.

[Timer Setting Screen]

Figure 4:
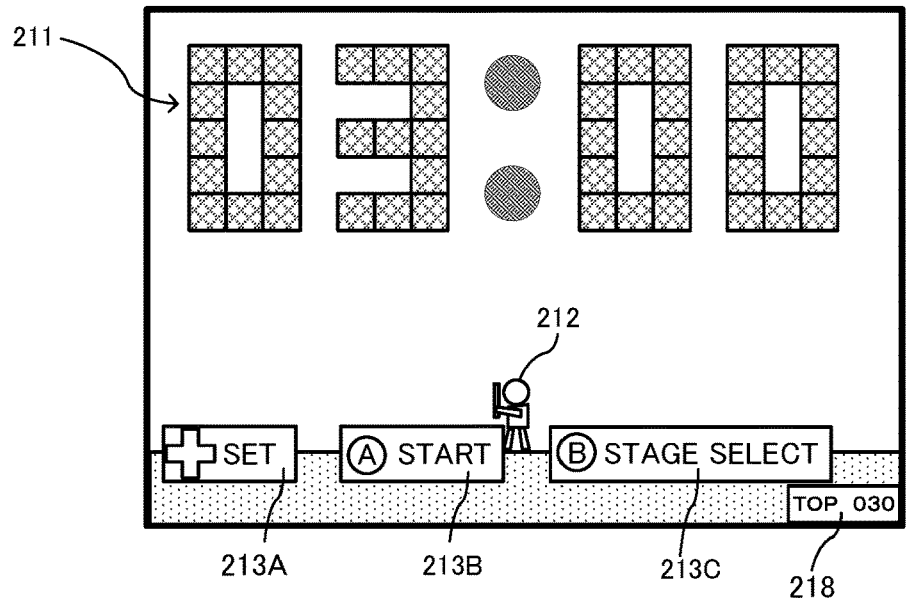
FIG. 4 illustrates a non-limiting example of a screen in a timer mode.

First, when the user selects and operates the choice button 201D in the above menu screen, a timer setting screen is displayed as shown in FIG. 4. In FIG. 4, a count image 211, a user object 212, operation guides 213A, 213B, and 213C, and a high score display 218 are displayed. The count image 211 shows the rest of a timer period in the form of "minutes: seconds". Each operation guide 213 is a display for guiding the user about an operation in the screen. The user object 212 is a virtual object to be operated by the user in game processing described later. The high score display 218 shows a high score corresponding to a stage being set and the timer period (details will be described later).

In the timer setting screen, a timer period can be set based on an operation by the user. Specifically, the user can increase the timer period by inputting the cross key 13 upward or rightward. In addition, the user can decrease the timer period by inputting the cross key 13 downward or leftward. Moreover, the numerical value shown as the count image 211 also changes according to the input. Moreover, the numerical value displayed in the high score display 218 also changes according to the input.

Here, in the exemplary embodiment, it is assumed that a timer period is set in units of 1 minute. Therefore, each time the cross key 13 is inputted upward or rightward, the numerical value of the count image 211 increases by 1 minute. In addition, each time the cross key 13 is inputted downward or leftward, the numerical value of the count image 211 decreases by 1 minute. It is assumed that the minimum value of the numerical value is 1 minute (1:00). As described above, in the exemplary embodiment, the timer period is 10 minutes at the maximum, so that 10 types of timer periods can be set in units of 1 minute from 1 minute to 10 minutes.

The setting unit for a timer period is not limited to 1 minute. In another exemplary embodiment, a timer period may be settable in units of 1 second. However, in relation to collection of high scores in the game processing described later, the unit of a time that can be set may be a time that is long to some extent. For example, a timer period may be set in units of 5 minutes, 2 minutes, 30 seconds, 10 seconds, or the like. That is, a timer period may be settable in a unit larger than the unit in which counting is performed (1 second).

The user can start countdown of the timer by pressing the A button 14 after operating the cross key 13 to set a timer period. In the exemplary embodiment, the game processing is also started at the same time the countdown of the timer is started.

[Outline of Game in Timer Mode]

Figure 5:
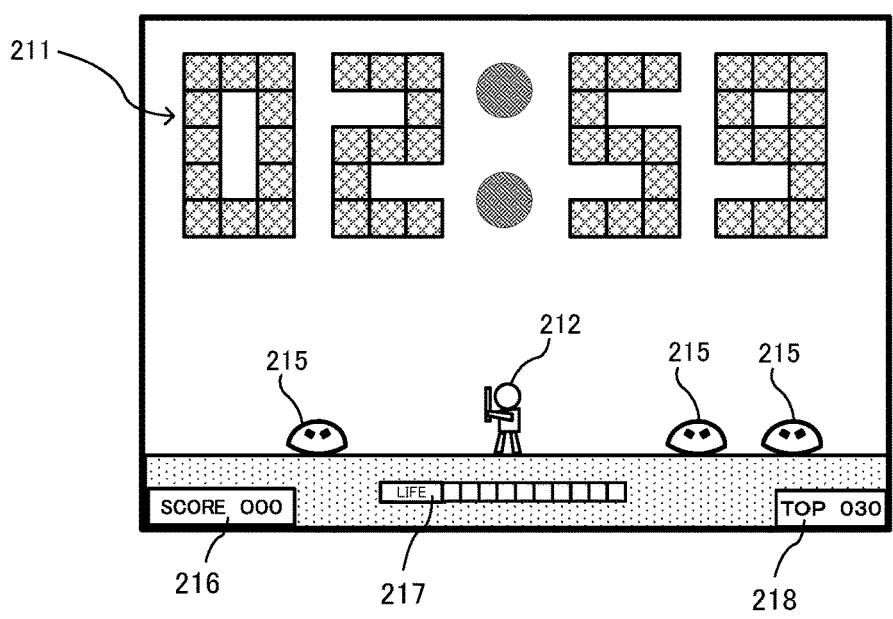
FIG. 5 illustrates a non-limiting example of a screen in the timer mode.

Next, the outline of the game in the timer mode will be described. The game illustrated in the exemplary embodiment is an action game with a fixed screen. FIG. 5 shows an example of a screen immediately after the start of counting of a timer period (immediately after the start of the game) (hereinafter, a screen from the start of counting of the timer period to the end of the counting is referred to as a counting screen). In FIG. 5, enemy objects (hereinafter, referred to simply as enemies) 215 are displayed in addition to the count image 211 and the user object 212. In addition, a score display 216, a life meter 217, and the high score display 218 are also displayed at a lower portion of the screen. This game is a game in which enemies 215 appearing in a screen are defeated by attacking the enemies 215. In this game, the number of enemies defeated is calculated as a score as it is. That is, this game is a game in which more enemies 215 are defeated during counting of the timer, to aim for a higher score. Each time the user object 212 is attacked by an enemy 215, the life meter 217 is decreased by one scale. However, even if the life meter 217 becomes 0, the game is not over, a representation in which the user object 212 is defeated is displayed, and then the user object 212 reappears in the screen (the scale of the life meter 217 is also restored). That is, as a penalty given when the life meter 217 becomes 0, a period in which the user object 212 cannot be operated and a time loss is caused occurs.

Figure 6:
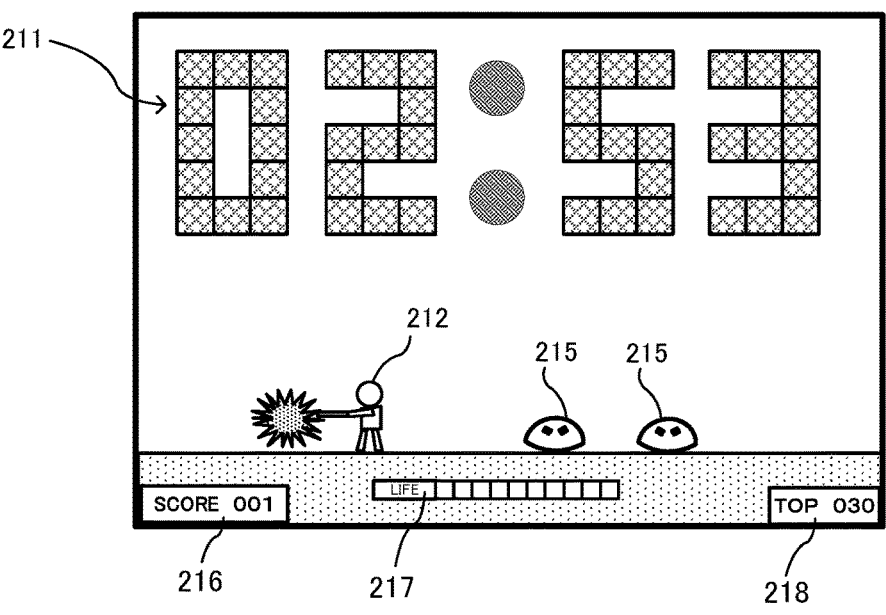
FIG. 6 illustrates a non-limiting example of a screen in the timer mode.

Next, a method for operating the user object 212 will be described. The user can move the user object 212 leftward and rightward by operating the cross key 13. In addition, the user can cause the user object 212 to jump by pressing the B button 15. Furthermore, the user can cause the user object 212 to swing a sword by pressing the A button 14, and can attack an enemy 215 by hitting the enemy 215 with the sword. FIG. 6 shows an example of a counting screen showing a state where the enemy 215 is attacked and defeated. In FIG. 6, an effect image showing that the enemy 215 has been defeated is displayed. Moreover, as for the score display 216, it is shown that the numerical value which is 0 in FIG. 5 has changed to 1.

[Control of User Object]

Here, control of the user object 212 in the game will be described. In the exemplary embodiment, two types of control, manual control and automatic control, can be used. In the manual control, movement of the user object 212 is controlled on the basis of an operation input on the cross key 13, the A button 14, and the B button 15 by the user. In the automatic control, movement of the user object 212 is controlled (automatically and autonomously) on the basis of AI control instead of such an operation input by the user. As the content of this AI control, the user object 212 is caused to automatically move and attack an enemy 215. In the exemplary embodiment, these two types of control can be switched as follows. First, the state at the start of the game is a state where the control is the manual control. Then, if there is no specific operation input from the user for 2 seconds during the game, the control is switched to the automatic control. For example, if the user does not operate the operation unit 104, which is used in the manual control such as the cross key 13, for 2 seconds after the game starts (or at a predetermined timing during the game), the user object 212 automatically starts moving and attacking an enemy 215. Furthermore, when the above operation input is performed by the user during the automatic control, the control is switched from the automatic control to the manual control. For example, when the user performs an operation on the cross key 13 or the like while the user object 212 is moving and attacking through the automatic control, the movement of the user object 212 can be controlled on the basis of an operation input by the user from that time point.

The operation input used in the manual control has been described as an example of the above specific operation input. However, in another exemplary embodiment, the specific operation input may be another input.

Moreover, as for the time for which there is no operation input, the above 2 seconds is an example, and it is needless to say that another time such as 3 seconds may be set as the threshold in another exemplary embodiment.

As described above, this game is a game in which enemies 215 are defeated through the manual control or the automatic control while a timer period is counted. Here, in the exemplary embodiment, as for addition of a score, not only enemies 215 defeated during the manual control but also enemies 215 defeated during the automatic control are added as a score. Therefore, for example, after the game starts, even if the user does not perform an operation input until the counting of the timer ends, the number of enemies 215 defeated by the user object 212 through the automatic control is calculated as a score. Even in the case of the manual control, in the case of the automatic control, or in the case of both the manual control and the automatic control, the highest score is recorded as a "high score". In addition, in the game played later, the high score is displayed in the high score display 218. In the exemplary embodiment, the AI control is adjusted so as to be control in which the skill level is not too high. The AI control is adjusted at least such that a highest score is not obtained. For example, the AI control is adjusted such that a score obtained when the game is advanced only through the automatic control until counting of the timer ends has enough room for the user to obtain a higher score by playing the game through the manual control. Accordingly, in the exemplary embodiment, motivation to enjoy playing the game through manual operation is provided to the user.

[Appearance Control of Enemies 215]

Next, supplementary description will be given regarding appearance control of enemies 215. The appearance control of enemies 215 may be any control, but in the exemplary embodiment, it is assumed that control, in which a set of enemies 215 that appear at one time is prepared, and if these enemies 215 are all defeated, the next set of enemies 215 appear, is performed. For example, the appearance control is control in which at the start of the game, three enemies 215 appear at the same time, and if these enemies 215 are all defeated, then five enemies 215 appear at the same time. In addition, in another exemplary embodiment, the appearance control of enemies 215 may be performed in conjunction with counting of a timer period. For example, during the timer period, control may be performed such that a boss character appears only during a certain time section. If the boss character can be defeated during this time section, a higher score may be obtained.

[Representation Accompanying End of Counting]

Figure 7:
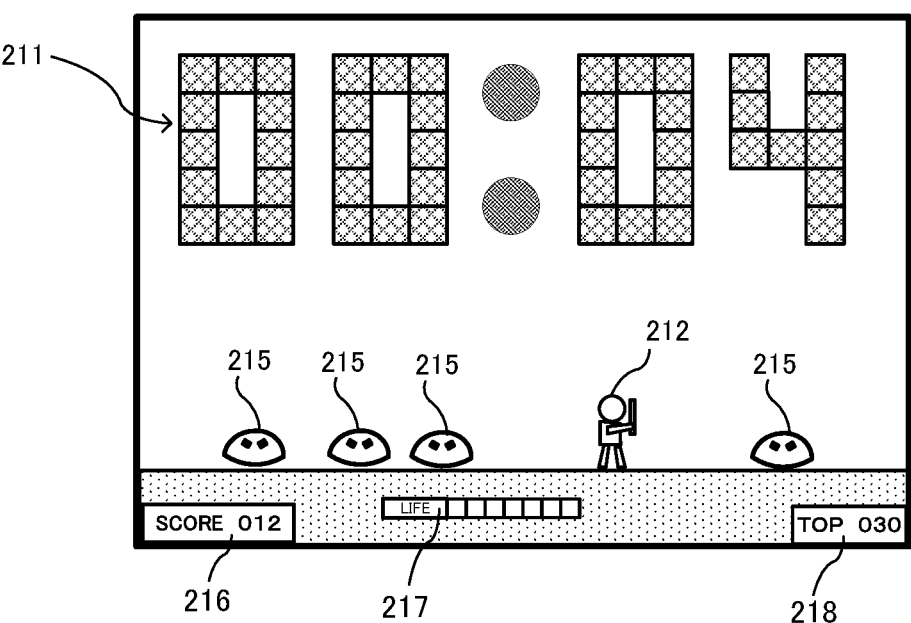
FIG. 7 illustrates a non-limiting example of a screen in the timer mode.
Figure 8:
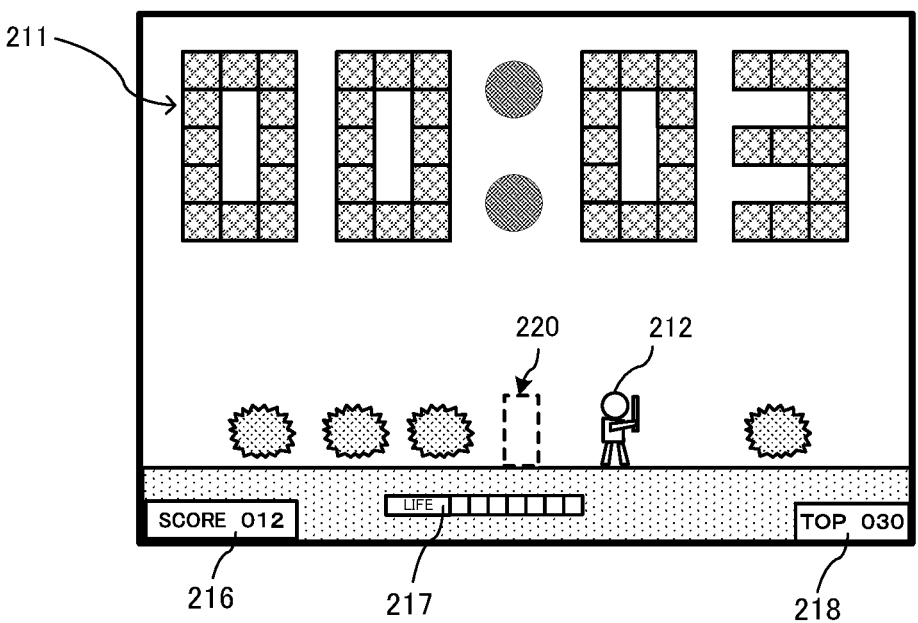
FIG. 8 illustrates a non-limiting example of a screen in the timer mode.

As described above, this game can be advanced through the manual control or the automatic control. Then, in the exemplary embodiment, when the counting of the timer proceeds and the time reaches 3 seconds before the end of the timer period, the manual control or the automatic control is stopped, and representation processing at the end of the game (hereinafter, referred to as closing representation) is started. FIG. 7 to FIG. 10 each show an example of a screen of the closing representation. First, FIG. 7 shows the time point 4 seconds before the end of the timer period, and at this time point, the game processing is still in progress through the manual control or the automatic control. After that, as shown in FIG. 8, 3 seconds before the end, the manual control cannot be performed (after that, the reception of an operation input for the user object 212 is restricted), and the automatic control is also stopped. Furthermore, a representation in which the enemies 215 remaining in the counting screen at this time point are all eliminated is performed. In addition, together with this representation, the user object 212 automatically starts moving toward a predetermined position in the screen, in the exemplary embodiment, toward a center position 220. The control related to the automatic movement is different from the AI control in the automatic control, and is control in which the user object 212 is merely moved toward the center position 220. In addition, in FIG.

8, for convenience of description, the center position 220 is shown by a dotted quadrangle, but is not actually displayed in the screen.

Figure 9:
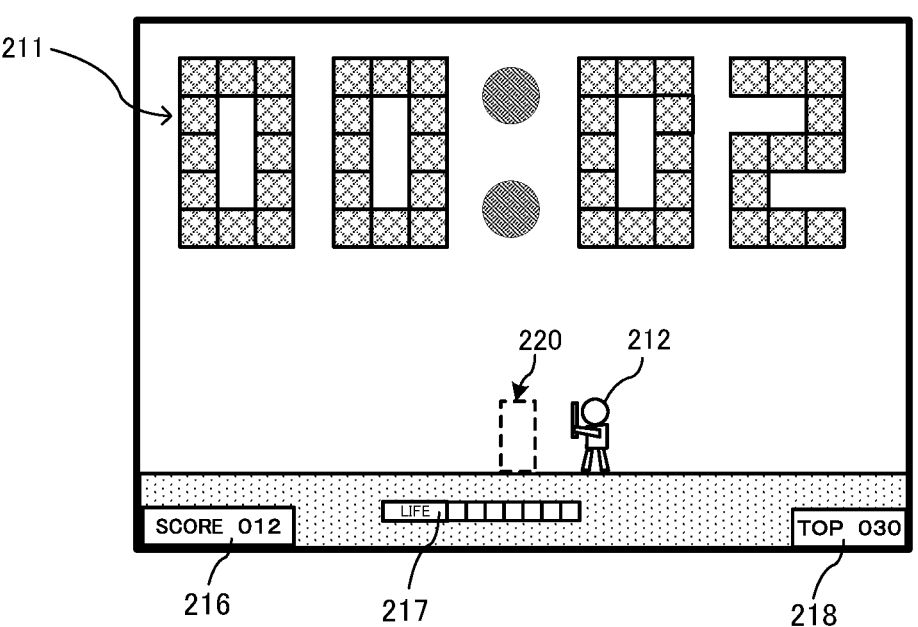
FIG. 9 illustrates a non-limiting example of a screen in the timer mode.
Figure 10:
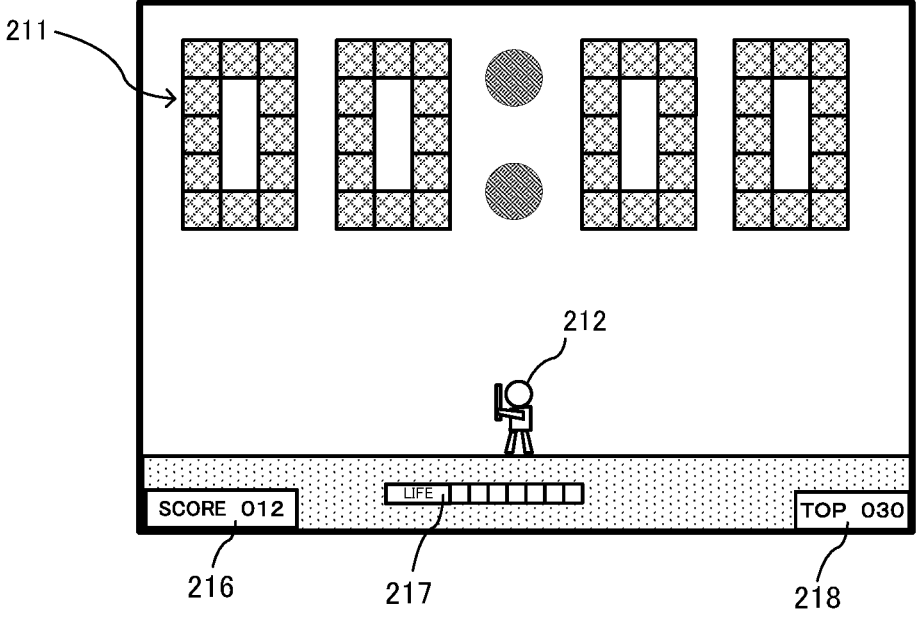
FIG. 10 illustrates a non-limiting example of a screen in the timer mode.

FIG. 9 shows a state 2 seconds before the end. At this time point, no enemy 215 is displayed, and the user object 212 is still (automatically) moving toward the center position 220. Then, when the timer period ends and the count reaches 0, the user object 212 has reached the center position 220 as shown in FIG. 10. This is the end of the closing representation.

Figure 11:
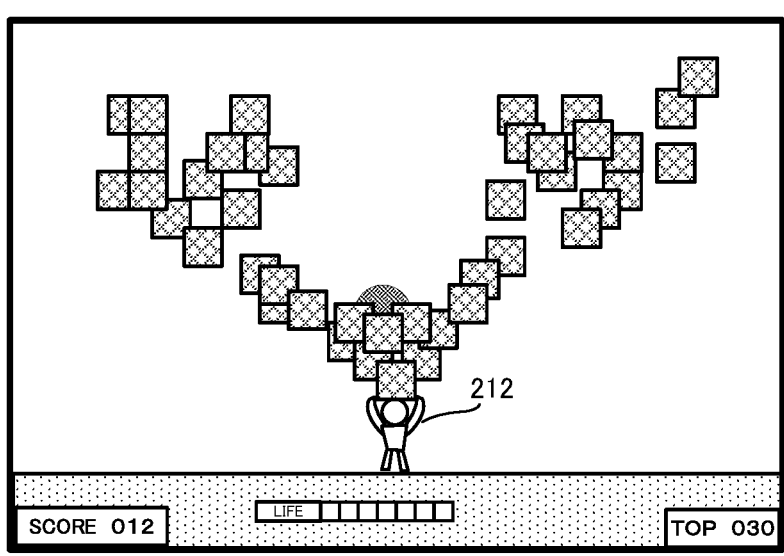
FIG. 11 illustrates a non-limiting example of a screen in the timer mode.

When the closing representation ends, a representation at the end of the timer period (hereinafter, referred to as end representation) is started as shown in FIG. 11. In FIG. 11, a representation in which the count image 211 becomes small blocks and gathers above the user object 212 is displayed for a predetermined time. This representation shows a state where the user object 212 collects the blocks constituting the count image 211. At this time, a predetermined sound effect (alarm sound or the like) indicating the end of the timer period may be outputted.

Here, in consideration of a time for which the user object 212 is moved such that the user object 212 is located at the center position 220 when the end representation starts, the closing representation is started 3 seconds before the end of the timer period. If the game can be continued through the manual control or the automatic control until the end of the timer period, the representation such as a sound effect may differ depending on the game status at the end of the timer period, resulting in a decrease in the functionality as a timer. From such a viewpoint, a margin for more reliably and clearly starting the end representation at the same timing as the end of the timer period is taken into consideration. In the exemplary embodiment, on the assumption that the time taken for the user object 212 to move from the edge of the screen to the center position 220 is 3 seconds at the maximum or less than 3 seconds, the above control is performed from 3 seconds before the end of the timer period. Therefore, in another exemplary embodiment, as long as the above margin is taken into consideration, the closing representation does not have to be started 3 seconds before the end of the timer period. Moreover, in another exemplary embodiment, such a margin may not necessarily be considered in particular (as long as it does not affect the representation at the end), and the game may be able to be played until the end of the timer period.

[Standby Screen]

Figure 12:
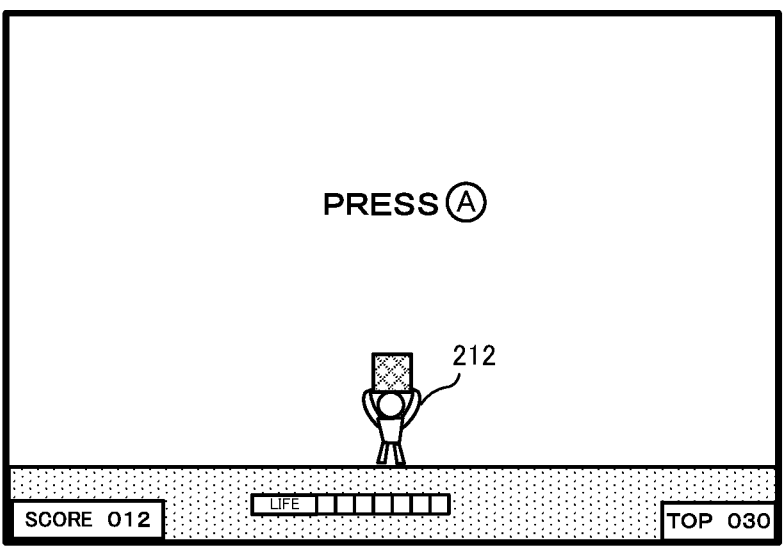
FIG. 12 illustrates a non-limiting example of a screen in the timer mode.

Next, after the end representation ends, a standby screen is displayed as shown in FIG. 12. In this screen, "PRESS A" for urging the user to press the A button 14 is displayed. Then, when the user presses the A button 14 in the standby screen, the screen returns to the timer setting screen shown in FIG. 4. On the other hand, when the A button 14 is left unpressed in the standby screen, for example, when a second time longer than a first time required to shift to a so-called sleep mode in the clock mode elapses, the mode may shift to the sleep mode. In this case, when the second time elapses in a state where the standby screen is displayed, the mode may shift directly to the sleep mode. Alternatively, even in the timer mode, in the case where setting in which the mode shifts to the sleep mode when the first time elapses is performed in the timer setting screen, when a third time elapses in the standby screen, the screen may automatically shift to the timer setting screen, and then the mode may shift to the sleep mode when the first time elapses later. That is, the time required to shift to the sleep mode in the standby screen (or from the standby screen) may be set to be longer than the time required to shift to the sleep mode in the clock mode. Accordingly, by continuing to display the standby screen for a period of time that is long to some extent, it is possible to increase the possibility that the user will notice the end of the timer period and reduce the power consumption due to the screen display being continued more than necessary. The third time may be longer than the first time. In addition, the time required to shift to the sleep mode in the timer setting screen may be different from the first time. However, even in that case, the total of this time and the third time may be set to be longer than the first time.

In the exemplary embodiment, the game processing refers to processing in a period from the start of the counting to the end of the counting (that is, timer period). That is, processing in a period (playable period) in which it is possible to earn a score by operating the user object 212 to attack an enemy 215 and processing related to the above closing representation correspond to the game processing. In addition, the processing related to the end representation and the processing related to the standby screen are treated as processing (processing after the end of the counting) different from the game processing. Moreover, processing including all the processing is treated as processing in the timer mode.

[Game Stage]

Next, supplementary description will be given regarding the concept of a "stage" of the game in the exemplary embodiment. The stage is one aspect of the type of game. In the game of the exemplary embodiment, a plurality of stages each of which is a stage in which the game is played. Specifically, three stages are prepared, and, in the timer setting screen of FIG. 4, it is possible to switch the stage in which the game is to be played, each time the B button 15 is pressed. In addition, background images (not shown) of the stages are different from each other, and enemies 215 to appear and movement patterns thereof in each stage are different from those in the other stages (the design of the count image 211 in each stage may be different from those in the other stages). That is, a plurality of types of games in which backgrounds (conceptually, scenes and areas in an in-game world) and enemies 215 to appear are different are provided to the user. By preparing a plurality of stages as described above, the entertainment characteristics of this game are further enhanced. For example, even when the timer period used by the user is the same every time (for example, when a timer of 3:00 is often used), it is possible to make the user enjoy a plurality of types of games by changing the stage.

[High Score]

Next, a high score in this game will be described. As described above, in this game, the number of enemies 215 defeated is used as a score as it is, and when the highest score is obtained, this score is recorded as a high score. Here, in the exemplary embodiment, the score and the high score are separately collected and recorded for each of the above stages and the settable periods of the timer. Specifically, in the exemplary embodiment, there are three stages, and a timer period can be set from 1 minute to 10 minutes in units of 1 minute. Therefore, in the exemplary embodiment, 30 high scores the number of which is equal to 3 stages×10 are recorded in total. Therefore, the content displayed in the high score display 218 is also the high score corresponding to the set timer period and the stage in which the game is being played. By recording a high score not only for each stage but also for each timer period as described above, an element of repeatedly playing the game during each timer period is provided to the user, so that the entertainment characteristics of the game are further enhanced. In addition, in the exemplary embodiment, the high score display 218 is displayed in the timer setting screen. Therefore, a fun way to set the timer to a timer period during which the high score can be updated, and enjoy playing the game only during the set time period, can be provided to the user.

As described above, in the exemplary embodiment, a game that has an element of repeatedly playing the game for competing for a score before the end of the timer period and is worthwhile for the user to play can be provided to the user.

[Details of Game Processing of Exemplary Embodiment]

Next, the above game processing will be described in more detail with reference to FIG. 13 to FIG. 20.

[Data to be Used]

Figure 13:
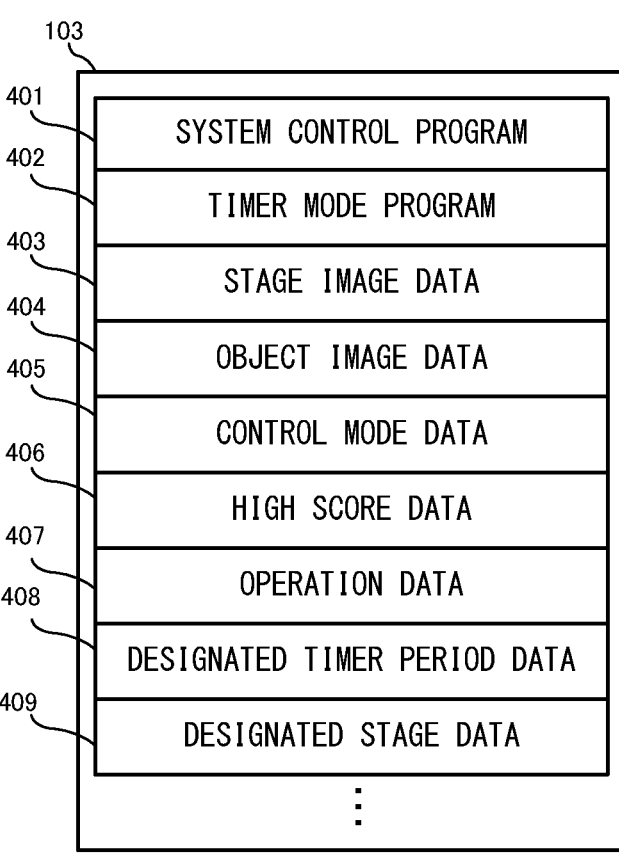
FIG. 13 illustrates a non-limiting example of data stored in a DRAM 103.

First, various kinds of data to be used in this processing will be described. FIG. 13 illustrates a memory map showing an example of various kinds of data stored in the DRAM 103 when the electronic device 10 operates in the timer mode. In the DRAM 103, at least a system control program 401, a timer mode program 402, stage image data 403, object image data 404, control mode data 405, high score data 406, operation data 407, designated timer period data 408, and designated stage data 409 are stored. Among them, the system control program 401, the timer mode program 402, the stage image data 403, and the object image data 404 are those stored in the flash memory 102 and read into the DRAM 103. The other data are generated and stored as appropriate when the processing of the exemplary embodiment is executed. In addition, the high score data 406 is continuously stored as one kind of saved data even after the timer mode ends.

The system control program 401 is a program for controlling the basic operation of the electronic device 10. For example, the system control program 401 is a program for executing a process of displaying the menu screen shown in FIG. 3 and a process of starting execution of the timer mode program 402 or the like, which will be described later, on the basis of an operation on the menu screen.

The timer mode program 402 is a program for executing the above processing in the timer mode. That is, the timer mode program 402 is a program for causing the electronic device 10 to function as a timer. The timer mode program 402 includes at least the code of a game program for executing the above game processing including the above-described processing related to the playable period and the processing related to the closing representation, the code of an end representation program for displaying the end representation, and the code of a program for executing the processing in the standby screen.

The control mode data 405 is data for indicating whether the present control of the user object 212 is performed through the manual control or the automatic control. The control is assumed to be initially "manual control".

The stage image data 403 is data of a background image corresponding to each of the above-described three stages.

The object image data 404 is image data for the user object 212 and the enemies 215.

The high score data 406 is data in which the above-described high score is recorded. FIG. 14 shows an example of the data structure of the high score data 406. The high score data 406 is data in a table format having items such as a stage number 4061, a timer period 4062, and a high score value 4063. The stage number 4061 is data indicating which of the above three stages is the stage. The timer period 4062 is data indicating the above 10 timer periods (1 minute to 10 minutes) for each stage. The high score value 4063 is data in which specific high score values corresponding to a predetermined stage and timer period are recorded. In the exemplary embodiment, due to the example of 3 stages and 10 timer periods, 30 high score values 4063 are recorded.

Referring back to FIG. 13, the operation data 407 is data indicating the content of an input on the operation unit 104 by the user.

The designated timer period data 408 is data indicating the timer period set in the setting screen by the user. The initial value of the designated timer period data 408 is assumed to be "3:00".

The designated stage data 409 is data indicating the above stage selected by the user in the setting screen. The stage thereof is assumed to be initially a "first stage".

In addition, although not shown, various kinds of data to be used in the game processing are generated as necessary and stored in the DRAM 103.

[Details of Processing Executed by Processor 101]

Next, the processing in the timer mode will be described in detail with reference to flowcharts in FIG. 15 to FIG. 20. It is noted that the processing described here is merely an example of general processing, and other processing may be added as appropriate without departing from the scope of the exemplary embodiment.

Figure 15:
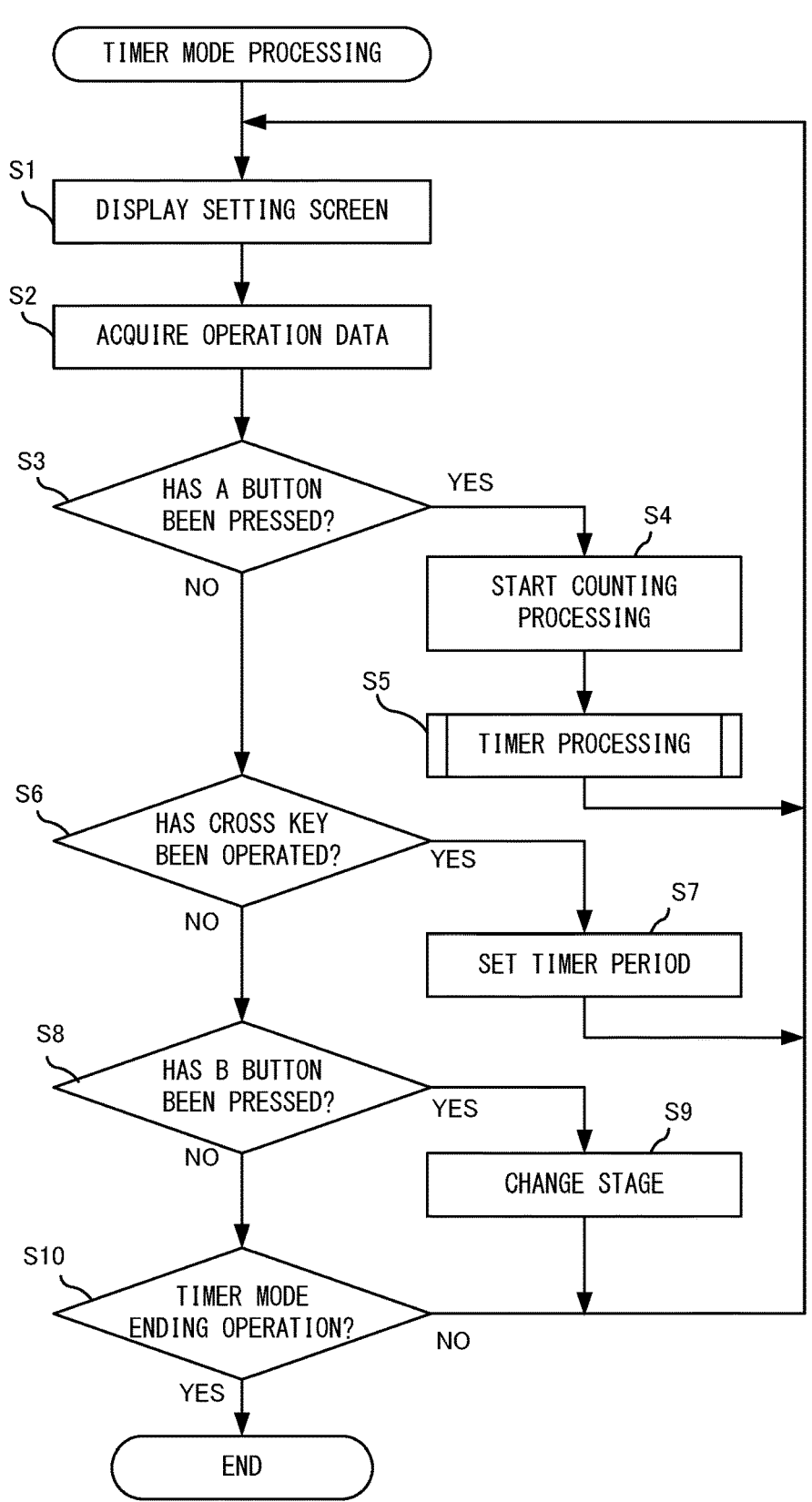
FIG. 15 is a non-limiting example flowchart showing the details of timer mode processing.

FIG. 15 is a flowchart showing the details of timer mode processing according to the exemplary embodiment. The execution of this processing is started in accordance with choice button 201D being selected in the menu screen shown in FIG. 3.

[Processing in Setting Screen]

In FIG. 15, first, in step S1, the processor 101 generates the above timer setting screen in which the count image based on the designated timer period data 408 and the background image of the stage based on the designated stage data 409 are set. Then, the processor 101 displays the timer setting screen on the display 12. Then, the processor 101 waits for an operation from the user.

Next, in step S2, the processor 101 acquires the operation data 407. Next, in step S3, the processor 101 determines whether the A button 14 has been pressed, on the basis of the operation data 407. If the A button 14 has been pressed (YES in step S3), in step S4, the processor 101 starts counting processing of counting a time related to the timer period. Next, in step S5, the processor 101 executes timer processing of executing the above game processing, etc. This processing will be described in detail later. When the timer processing ends, the processor 101 returns to step S1 and repeats the processing.

On the other hand, as a result of the determination in step S3, if the A button 14 has not been pressed (NO in step S3), next, in step S6, the processor 101 determines whether the cross key 13 has been operated, on the basis of the operation data 407. If the cross key 13 has been operated (YES in step S6), in step S7, the processor 101 sets the content of the designated timer period data 408 on the basis of the specific content of the operation. That is, the processor 101 increases or decreases the timer period in units of 1 minute, and sets that period as the designated timer period data 408. Thereafter, the processor 101 returns to step S1 and repeats the processing.

On the other hand, as a result of the determination in step S6, if the cross key 13 has not been operated (NO in step S6), next, in step S8, the processor 101 determines whether the B button 15 has been pressed. If the B button 15 has been pressed (YES in step S8), in step S9, the processor 101 changes the content of the designated stage data 409 in accordance with the operation. More specifically, each time the B button 15 is pressed, the processor 101 changes the content of the designated stage data 409 in the order of the first stage, a second stage, and a third stage. Thereafter, the processor 101 returns to step S1 and repeats the processing.

On the other hand, as a result of the determination in step S8, if the B button 15 has not been pressed (NO in step S8), in step S10, the processor 101 determines whether a predetermined operation for ending the timer mode has been performed. As a result, if the operation has been performed (YES in step S10), the processor 101 ends the timer mode processing. If the operation has not been performed (NO in step S10), the processor 101 returns to step S1 and repeats the processing.

[Timer Processing]

Figure 16:
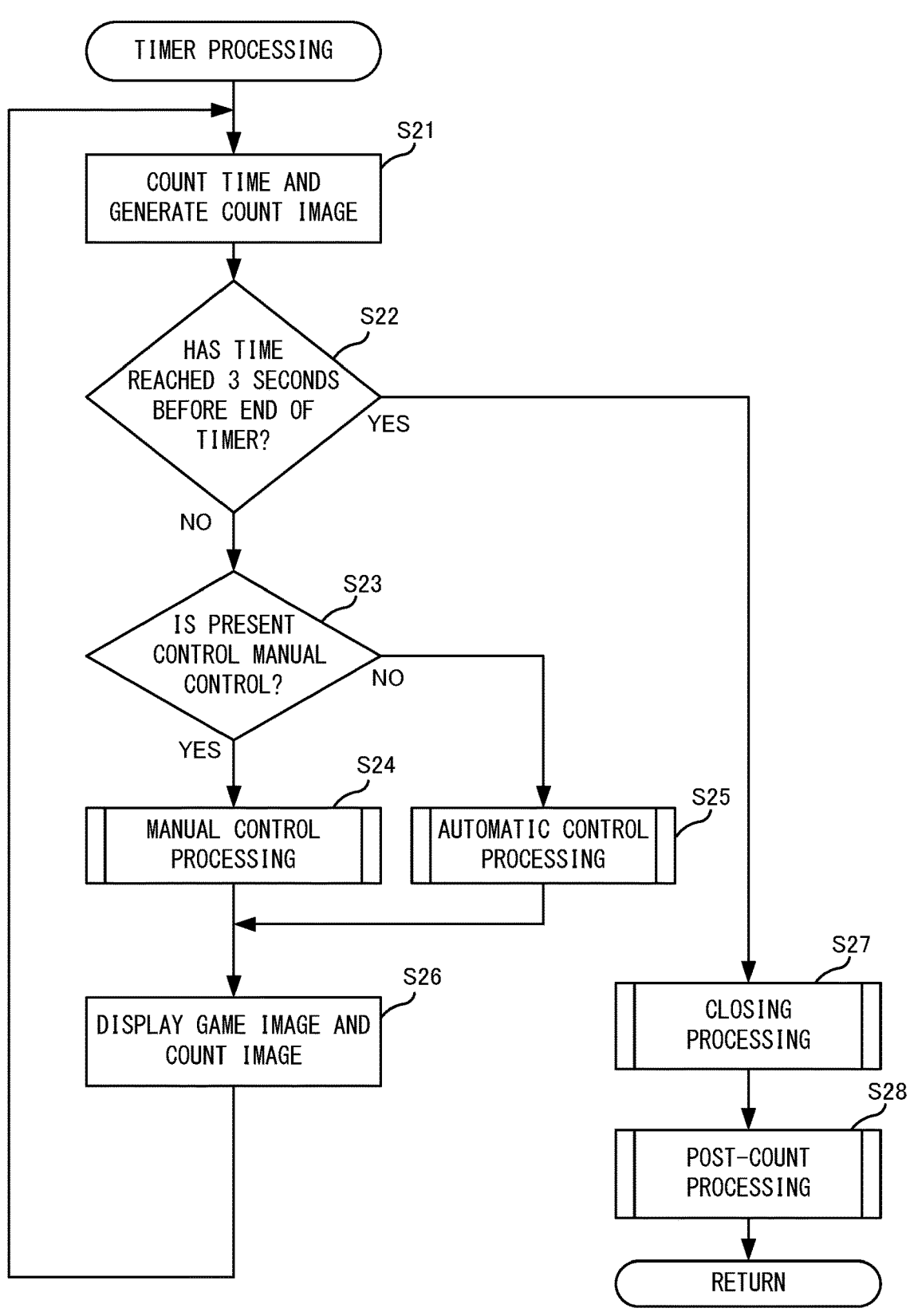
FIG. 16 is a non-limiting example flowchart showing the details of timer processing.

Next, the timer processing related to step S5 will be described in detail. FIG. 16 is a flowchart showing the details of the timer processing. A processing loop of steps S21 to S26 in this processing is repeatedly executed every predetermined time such as $\frac{1}{30}$ seconds (30 frames) or $\frac{1}{60}$ seconds (60 frames).

In FIG. 16, first, in step S21, the processor 101 advances the counting of the time related to the timer period and generates the above count image 211 corresponding to the content thereof. In the exemplary embodiment, the display content of the count image 211 changes (the numerical value decreases by 1 second) each time a time of 1 second elapses.

Next, in step S22, the processor 101 determines whether the time has reached 3 seconds before the end of the timer period. As a result of the determination, if the time has not reached 3 seconds before (NO in step S22), in step S23, the processor 101 refers to the control mode data 405 and determines whether the present control method for the user object 212 is the manual control or the automatic control. As a result of the determination, if the present control method is the manual control (YES in step S23), in step S24, the processor 101 executes manual control processing. On the other hand, if the present control method is not the manual control (NO in step S23), in step S25, the processor 101 executes automatic control processing. Hereinafter, each control processing will be described in detail.

[Manual Control Processing]

Figure 17:
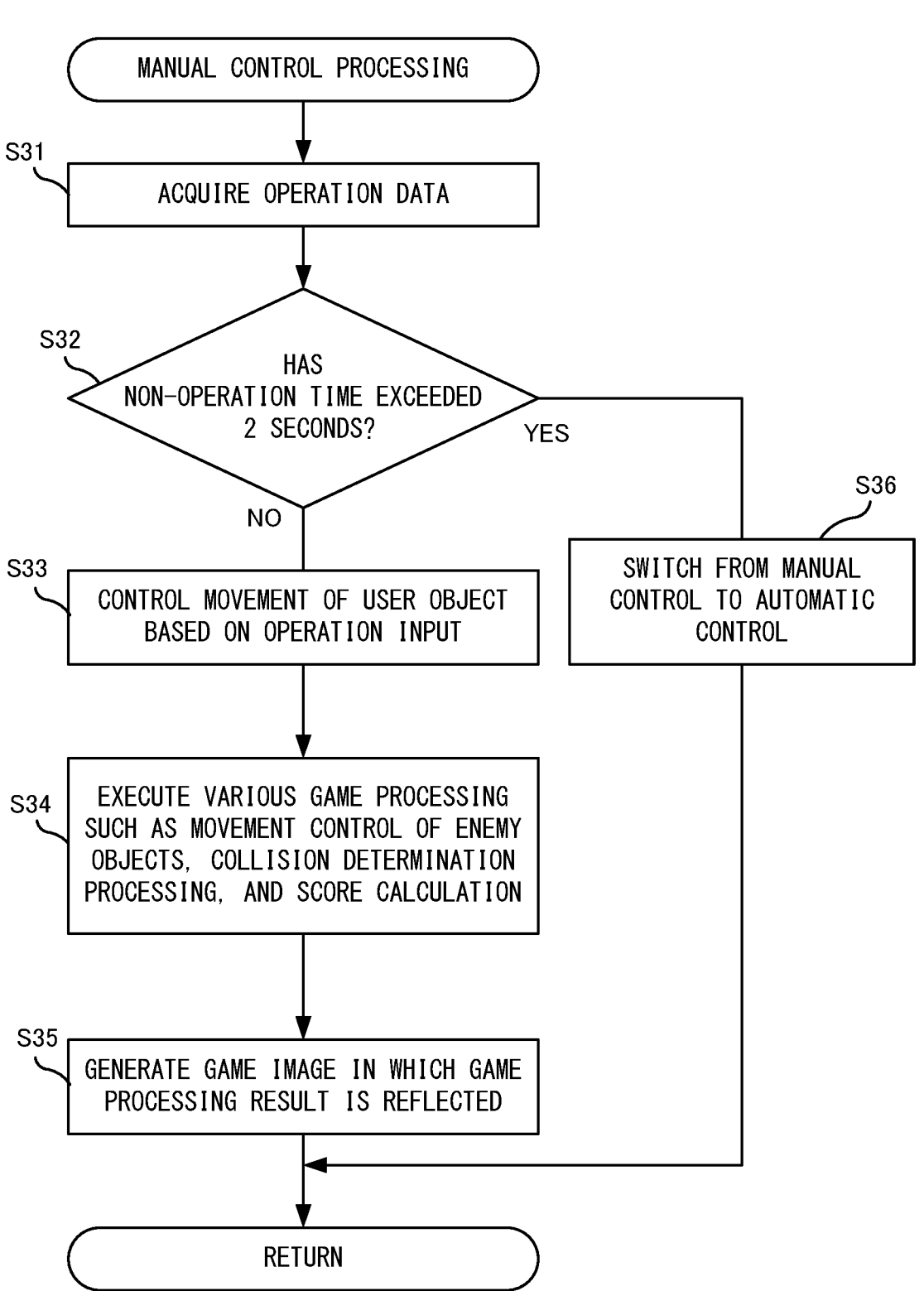
FIG. 17 is a non-limiting example flowchart showing the details of manual control processing.

FIG. 17 is a flowchart showing the details of the manual control processing. In FIG. 17, in step S31, the processor 101 acquires the operation data 407. Next, in step S32, the processor 101 determines whether a non-operation time during which an operation input for operating the user object 212 is not performed has exceeded 2 seconds, on the basis of the operation data 407. Here, the non-operation time may be measured by any method, but may be measured, for example, by the following method. Specifically, a monitoring timer (the initial value is 2 seconds) for monitoring the non-operation time is set in advance, and the monitoring timer is decreased while there is no operation input for the user object 212. In addition, the monitoring timer is reset each time an operation input is performed. The processor 101 may measure the non-operation time by performing such control using the monitoring timer.

As a result of the determination, if the non-operation time has exceeded 2 seconds (YES in step S32), in step S36, the processor 101 switches the control of the user object 212 from the manual control to the automatic control. Specifically, the processor 101 changes the content of the control mode data 405 from the manual control to the automatic control. Thereafter, the processor 101 ends the manual control processing.

On the other hand, as a result of the determination in step S32, if the non-operation time has not exceeded 2 seconds (NO in step S32), in step S33, the processor 101 controls the movement of the user object 212 on the basis of the operation content indicated by the acquired operation data 407.

Next, in step S34, the processor 101 executes other game processing. Specifically, the processor 101 performs the following processing. First, the processor 101 performs appearance control and movement control of enemies 215. Furthermore, the processor 101 performs determination processing as to a collision between the user object 212 and an enemy 215, and also performs determination as to whether an attack against an enemy 215 has been successful, determination as to whether the user object 212 has been attacked, determination as to the damage by the attack, etc. Moreover, the processor 101 also performs score calculation when an enemy 215 is defeated. In addition, the processor 101 also executes various kinds of game processing, such as updating the content of the score display 216, as appropriate. The appearance control of enemies 215 may be any control. For example, contents that define the number of enemies 215 to appear and the type of the enemies 215 may be set as one set, and an enemy appearance pattern table in which a plurality of such sets are defined may be prepared. In this pattern table, the order in which the sets are used is also defined. Then, the processor 101 may cause a predetermined enemy 215 to appear on the basis of the pattern table.

Next, in step S35, the processor 101 generates a game image in which the result of the game processing is reflected. Thereafter, the processor 101 ends the manual control processing.

[Automatic Control Processing]

Figure 18:
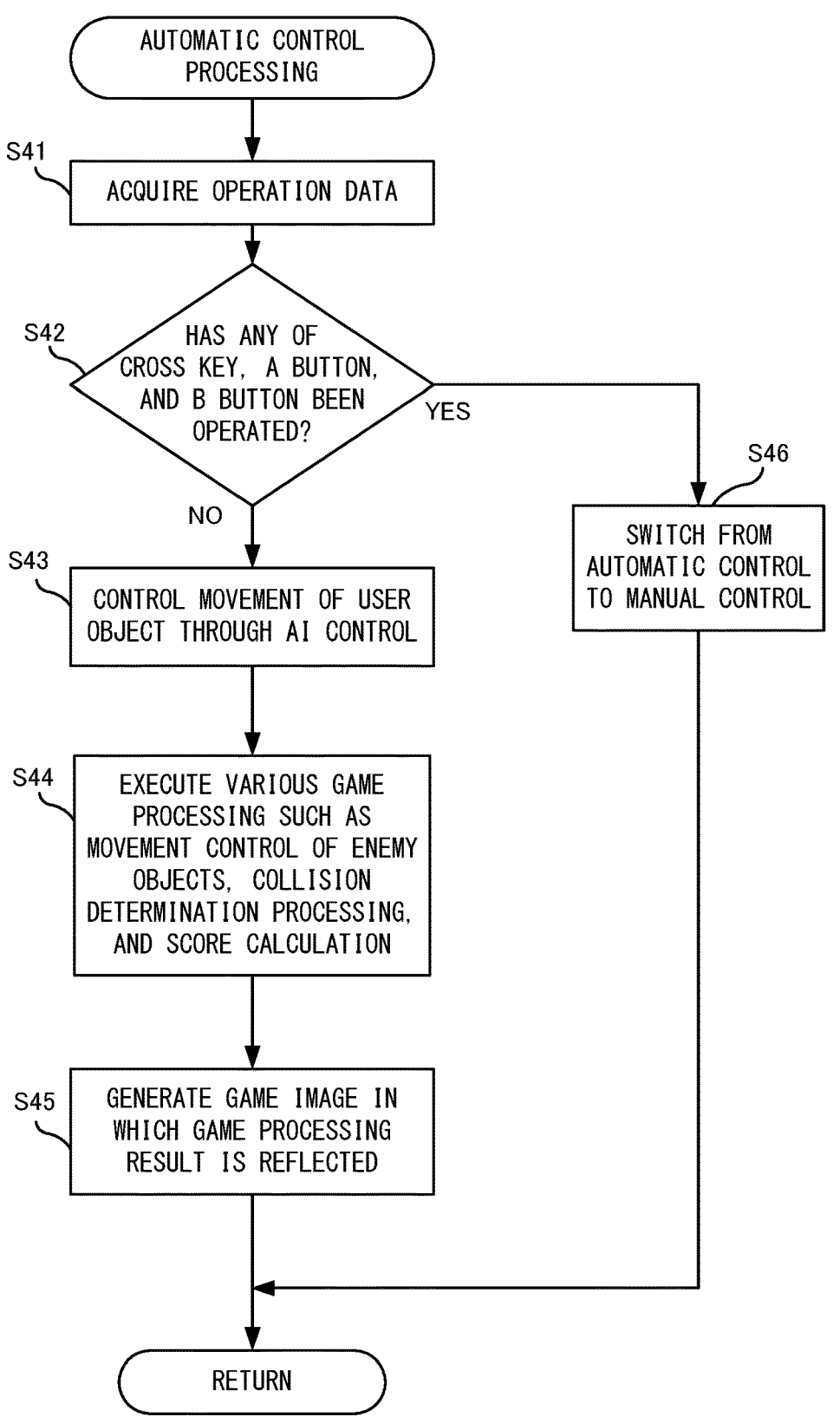
FIG. 18 is a non-limiting example flowchart showing the details of automatic control processing.

Next, the automatic control processing related to step S25 will be described in detail. FIG. 18 is a flowchart showing the details of the automatic control processing. In FIG. 18, in step S41, the processor 101 acquires the operation data 407. Next, in step S42, the processor 101 determines whether an operation input on any of the cross key 13, the A button 14, and the B button 15 has been performed by the user, on the basis of the operation data 407. That is, the processor 101 determines whether such an operation input has been performed by the user during the automatic control. As a result of the determination, when any of the operations has been performed (YES in step S42), in step S46, the processor 101 switches the control of the user object 212 from the automatic control to the manual control. Specifically, the processor 101 changes the content of the control mode data 405 from the automatic control to the manual control. Thereafter, the processor 101 ends the automatic control processing.

On the other hand, as a result of the determination in step S42, if none of the above operation inputs has been performed (NO in step S42), in step S43, the processor 101 performs movement control of the user object 212 through the AI control.

Next, in step S44, the processor 101 executes other game processing. This processing is the same as the processing in step S34, and thus the description thereof is omitted here.

Next, in step S45, the processor 101 generates a game image in which the result of the game processing is reflected. Thereafter, the processor 101 ends the automatic control processing.

Referring back to FIG. 16, next, in step S26, the processor 101 generates the counting screen (for example, FIG. 5, FIG. 6, or the like) including the game image generated in the above manual control processing or automatic control processing and the count image generated in step S21. Then, the processor 101 displays the counting screen by outputting the counting screen to the display 12. Thereafter, the processor 101 returns to step S21 and repeats the processing.

Next, the case where, as a result of the determination in step S22, it is determined that it is 3 seconds before the end of the timer period (YES in step S22), will be described. In this case, in step S27, the processor 101 executes closing processing.

[Closing Processing]

Figure 19:
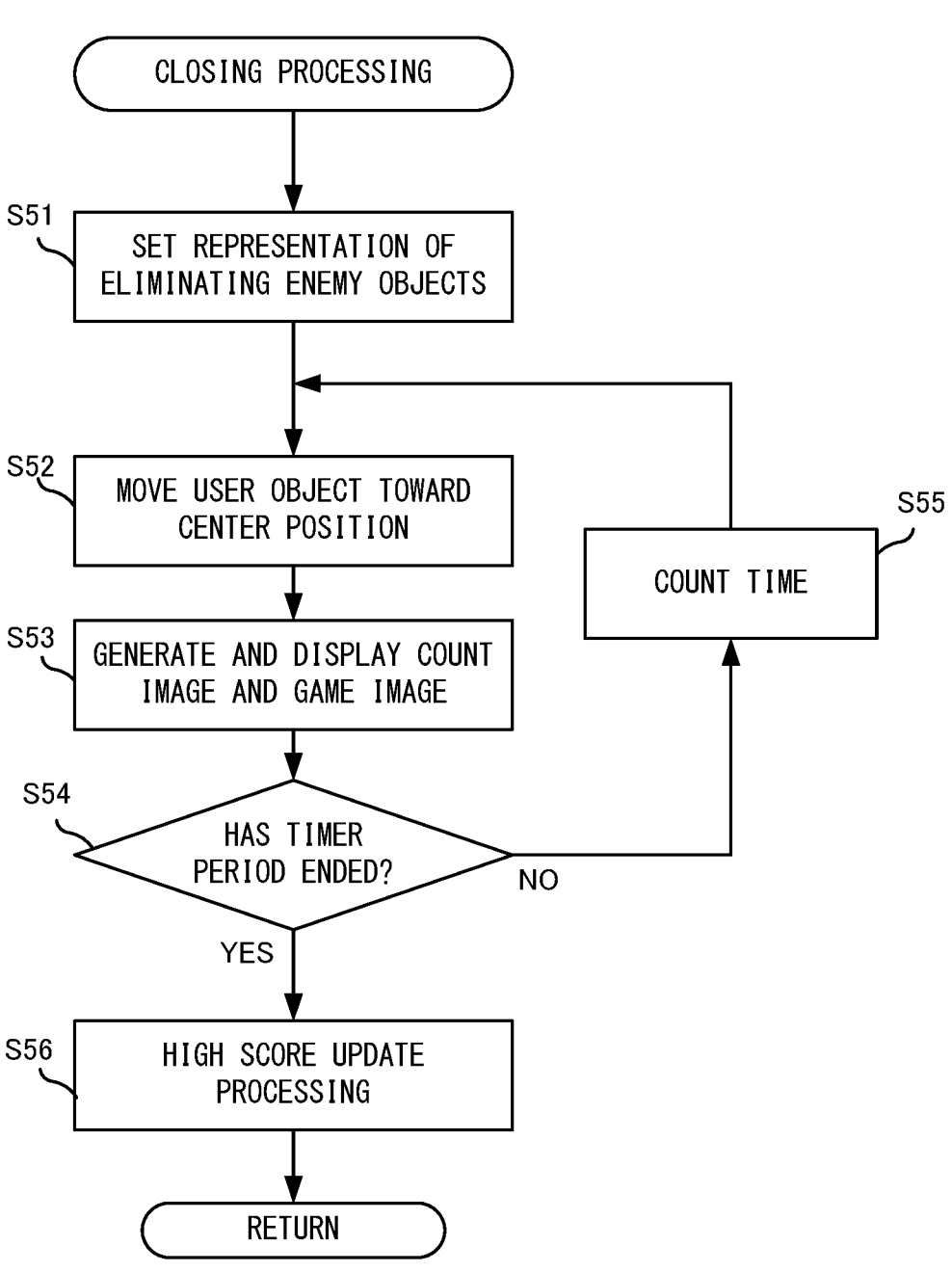
FIG. 19 is a non-limiting example flowchart showing the details of closing processing.

FIG. 19 is a flowchart showing the details of the closing processing. In FIG. 19, first, in step S51, the processor 101 performs setting for displaying a representation in which the enemies 215 appearing (remaining in the screen) at this time point are eliminated. The specific representation content may be any representation. For example, if this elimination representation is a representation that is to be displayed over 1 second, the processor 101 performs predetermined setting related to screen display such that the elimination representation is displayed for the next 1 second.

Next, in step S52, the processor 101 automatically moves the user object 212 toward a predetermined position, in the exemplary embodiment, toward the center position 220 shown in FIG. 8. If the user object 212 has reached the center position 220, the processor 101 causes the user object 212 to wait at that position.

Next, in step S53, the processor 101 generates the count image 211 and a game image in which the above processing is reflected, further generates a counting screen including these images, and displays the counting screen on the display 12.

Next, in step S54, the processor 101 determines whether the timer period has ended. As a result of the determination, if the timer period has not ended (NO in step S54), in step S55, the processor 101 advances the counting of the time related to the timer period and generates a count image. Thereafter, the processor 101 returns to step S52 and repeats the processing.

On the other hand, as a result of the determination in step S54, if the timer period has ended (YES in step S54), in step S56, the processor 101 executes high score update processing. Specifically, the processor 101 determines whether the score in the present game is a high score, on the basis of the high score data 406. Specifically, if the score in the present game is higher than the score corresponding to the high score value 4063 corresponding to the stage number 4061 and the timer period 4062 related to the present game, the processor 101 updates the high score value 4063 to this score. On the other hand, if the score in the present game is not a high score, the processor 101 advances the processing to the next step without updating the high score data 406.

When the processing in step S56 ends, the processor 101 ends the closing processing.

[Post-Count Processing]

Figure 20:
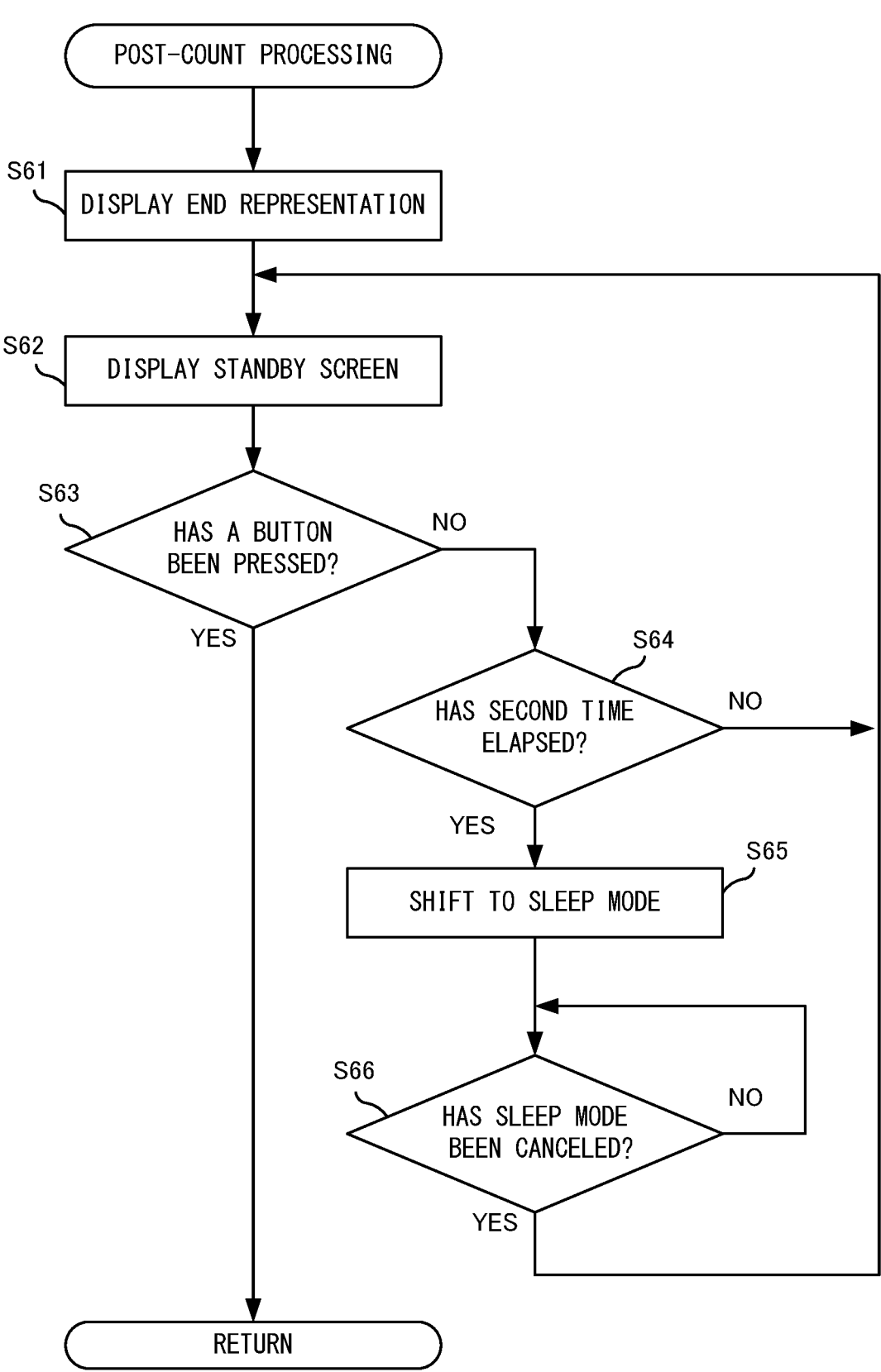
FIG. 20 is a non-limiting example flowchart showing the details of post-count processing.

Referring back to FIG. 16, when the closing processing ends, next, in step S28, the processor 101 executes post-count processing. FIG. 20 is a flowchart showing the details of the post-count processing. In FIG. 20, first, in step S61, the processor 101 ends the counting processing, and displays the end representation described with reference to FIG. 11, on the display 12 (for a predetermined period).

Next, in step S62, the processor 101 displays the standby screen shown in FIG. 12 and waits for an operation input from the user.

Next, in step S63, the processor 101 acquires the operation data 407 and determines whether the A button 14 has been pressed. If the A button 14 has been pressed (YES in step S63), the processor 101 eliminates the standby screen and ends the closing processing.

On the other hand, if the A button 14 has not been pressed (NO in step S63), next, in step S64, the processor 101 determines whether the second time has elapsed from the start of display of the standby screen. As a result of the determination, if the second time has not elapsed (NO in step S64), the processor 101 returns to step S62 and continues to display the standby screen. On the other hand, if the second time has elapsed (YES in step S64), in step S65, the processor 101 executes processing of shifting to the sleep mode. Next, in step S66, the processor 101 determines whether the sleep mode has been canceled. If the sleep mode has not been canceled (NO in step S66), the processor 101 continues the sleep mode. If the sleep mode has been canceled (YES in step S66), the processor 101 returns to step S62 and repeats the processing. At this time, the processor 101 redoes the counting of the second time (initializes the counter for the second time, etc.).

Referring back to FIG. 16, when the post-count processing ends, the processor 101 ends the timer processing. Thereafter, the processor 101 returns to step S1 and repeats the processing.

As for the processing performed when the second time has elapsed, in another exemplary embodiment, the processor 101 may end the post-count processing, return to the process in step S1, and display the timer setting screen.

This is the end of the detailed description of the game processing according to the exemplary embodiment.

As described above, in the exemplary embodiment, game processing that is to be completed at the end of the timer period is executed during the counting of time in the timer period. Accordingly, it is possible to have entertainment characteristics during the timer period. In addition, the game ends with the end of the timer period, so that the end of the timer period can be used as a breakpoint. Therefore, it is possible to prevent a situation in which, for example, when moving to another work after the end of the timer period, the user is conscious of the game that has been played so far, and is reluctant to move to the other work, or cannot concentrate on the other work even if the user moves to the other work.

Moreover, in the above game, it is possible to switch between the automatic control and the manual control as described above. Therefore, the user can wait for the end of the timer period while playing the game by controlling the movement of the user object 212 by themselves, and, for example, when the user has to continue other work at hand, the user can wait for the end of the timer period while watching the game controlled through the automatic control. In either case, entertainment characteristics of the game in a wait time can be provided to the user, rather than just waiting for the timer.

[Modifications]

In the above embodiment, the control of the user object 212 at the start of the game is the manual control, and is switched to the automatic control if a non-operation time continues for a predetermined time or longer. In another exemplary embodiment, the user object 212 may be basically moved through the automatic control, and if an operation input has been performed by the user, the movement of the user object 212 may be controlled on the basis the content of the operation while there is the operation input.

In another exemplary embodiment, switching from the automatic control to the manual control or switching from the manual control to the automatic control may be performed only once.

Moreover, switching from the manual control to the automatic control may be performed when a specific button is pressed.

In the above embodiment, the example in which the count image of the timer and the game image are displayed in the same screen has been described. In another exemplary embodiment, the count image and the game image may be displayed on different displays. For example, in the case where the above processing is performed in an electronic device including two displays as display units, the count image and the game image may be displayed on different displays.

In another exemplary embodiment, in the standby screen, the user object 212 may be caused to make demonstration movement. In addition, in the standby screen, the user object 212 may be able to be operated. Furthermore, in the standby screen, new game processing may be started. In this case, the game processing may be executed such that the above score calculation is not performed In the above embodiment, the example in which the closing representation is displayed from 3 seconds before the end of the timer period has been described. However, in another exemplary embodiment, such representation display may not necessarily be performed in particular, and only an operation input by the user may be restricted. For example, 3 seconds before the end of the timer period, the movement of the user object 212 and the enemies 215 may be stopped, and the end of the timer period may be reached in this state. Then, during this period, the reception of an operation input by the user may be restricted.

As for the types of games, in the above embodiment, the example in which three types of "stages" in which background images and enemies 215 to appear are different has been described. In the above example, the genre of the game itself is the same action game, and the operation method and the control method for the user object 212 are also the same. In this regard, in another exemplary embodiment, the genre of the game itself may be made different instead of the above stage change. For example, an action game may be provided as the first stage, a shooting game may be provided as the second stage, and a rhythm game may be provided as the third stage (in this case, a piece of music corresponding to the length of the timer period may be prepared).

In another exemplary embodiment, for various images (the user object 212, the enemies 215, the background image) used in the game processing in the timer mode, image data used in the game processing corresponding to the above-described choice buttons 201A to 201C may be used. Accordingly, it is possible to save the storage capacity and reduce the development cost.

The timing of updating the high score is not limited to the above timing. In the above embodiment, the example in which the high score is updated in the closing processing has been described. However, the timing is not limited thereto, and, during the game processing, the high score may be updated before the closing processing. For example, the high score may be updated at the time when the score exceeds the high score during game play. After that, during the same game, the score is increased, and the high score is also updated in real time. For example, even if the application itself is terminated before the closing processing in a state where the high score is updated during the game, the updated score is recorded as a high score in the high score data 406. In addition, when the high score has been updated, special representation processing such as blinking the screen may be executed in the closing processing.

As for shift to the sleep mode, in the above embodiment, the example in which the mode shifts to the sleep mode if the second time elapses while the A button 14 is left unpressed in the standby screen has been described. In another exemplary embodiment, control in which the mode does not shift to the sleep mode during the timer mode may be performed. In this case, the standby screen continues to be displayed until the A button 14 is pressed in the standby screen. Accordingly, it is possible to increase the possibility that the user will notice the end of the timer time.

As for shift to the sleep mode, the mode may shift to the sleep mode even while the game processing corresponding to any of the choice buttons 201A to 201C in FIG. 3 is executed (while the game is played). In addition, even in the menu screen shown in FIG. 3, the mode may shift to the sleep mode. The time required to shift to the sleep mode in each of these cases may be the first time as in the clock mode, or may be different from the first time. In addition, in the case where this time is different from the first time, the time may be shorter than the second time, which is the time required to shift to the sleep mode in the standby screen.

While the exemplary embodiments have been described in detail, the foregoing description is in all aspects illustrative and not restrictive. It is to be understood that numerous other modifications and variations can be devised without departing from the scope of the exemplary embodiments.

What is claimed is:

1. An electronic device, comprising:
   at least one user input unit;
   at least one display unit; and
   at least one processor,
   wherein the electronic device is configured to:
       set a timer period, from a plurality of timer periods, on the basis of a first user input on the user input unit;
       execute counting processing of counting a time, during the timer period;
       execute game processing including control of a virtual object, from start of the counting in the timer period to end of the counting, wherein the game processing includes a plurality of stages, and each of plurality of timer periods are adjustable, in specified time units, between at least a first time period and a second time period for each stage from the plurality of stages;
       output a count image indicating a state of the counting by the counting processing and a game image by the game processing to the display unit;
       calculate a score as a value obtained by scoring a result of predetermined processing performed in the game processing; and
       store a high score in a memory for each timer period, from the plurality of timer periods, for each stage, from the plurality of stages, in the game processing, wherein
   the electronic device is further configured to switch the control of the virtual object between manual control based on a second user input on the user input unit, and automatic control in which control is performed without being based on the second user input, during the game processing,
   the electronic device includes a clock function, and
   while the electronic device is functioning as a clock, the electronic device shifts to a sleep mode if a predetermined time elapses, and when executing the counting processing, the electronic device does not shift to the sleep mode even if the predetermined time elapses.

2. The electronic device according to claim 1, wherein the electronic device is configured to switch the control of the virtual object to the automatic control if there is no specific user input for a predetermined time or longer while the virtual object is controlled through manual control.

3. The electronic device according to claim 1, wherein the electronic device is configured to switch the control of the virtual object to the manual control if a specific user input is performed while the virtual object is controlled through the automatic control.

4. The electronic device according to claim 1, wherein the electronic device is configured to:

select one game from among a plurality of types of games prepared, on the basis of a fourth user input, and execute the game processing related to the selected game; and store the high score in the memory for each of the types of games along with an associated timer period, from the plurality of timer periods.

5. The electronic device according to claim 1, wherein the electronic device is configured to set the timer period in any of units of 1 minute, units of 30 seconds, and units of 10 seconds.

6. The electronic device according to claim 1, wherein the electronic device is configured to calculate the score while the user object is controlled through the manual control or even while the user object is controlled through the automatic control.

7. The electronic device according to claim 1, wherein the electronic device is further configured to:

restrict a user input for operating the virtual object, from a predetermined time before the counting in the timer period ends; and when the counting in the timer period ends, execute displaying a predetermined representation accompanying the end.

8. The electronic device according to claim 1, wherein, after the counting in the timer period ends, the electronic device does not shift to the sleep mode until a predetermined input is performed.

9. The electronic device according to claim 1, wherein while the electronic device is functioning as a clock, the electronic device shifts to the sleep mode if a first predetermined time elapses, and while the electronic device is not functioning as a clock, after the processor ends the counting processing, the electronic device shifts to the sleep mode if a second predetermined time longer than the first predetermined time elapses.

10. The electronic device according to claim 1, wherein the electronic device is configured to execute other game processing that is executable without setting the timer period and that is processing different from the executed game processing, and image data to be used in the game processing is the same as image data to be used in the other game processing.

11. A non-transitory computer-readable storage medium having stored therein instructions that, when executed by a processor of an electronic device including at least one user input unit, at least one display unit, and at least one processor, cause the processor of the electronic device to provide execution comprising:

setting a timer period, from a plurality of timer periods, on the basis of a first user input on the user input unit;

executing counting processing of counting a time, during the timer period;

executing game processing including control of a virtual object, from start of the counting in the timer period to end of the counting, wherein the game processing includes a plurality of stages, and each of plurality of timer periods are adjustable, in specified time units, between at least a first time period and a second time period for each stage from the plurality of stages;

outputting a count image indicating a state of the counting by the counting processing and a game image by the game processing to the display unit;

calculating a score as a value obtained by scoring a result of predetermined processing performed in the game processing; and storing a high score in a memory for each timer period, from the plurality of timer periods, for each stage, from the plurality of stages, in the game processing, wherein the control of the virtual object is switchable between manual control based on a second user input on the user input unit, and automatic control in which control is performed without being based on the second user input, during the game processing, the electronic device includes a clock function, and while the electronic device is functioning as a clock, the electronic device shifts to a sleep mode if a predetermined time elapses, and when executing the counting processing, the electronic device does not shift to the sleep mode even if the predetermined time elapses.

12. A method for game processing implemented via an electronic device, the method comprising:

setting a timer period, from a plurality of timer periods, on the basis of a first user input on a user input unit;

executing counting processing of counting a time, during the timer period;

executing game processing including control of a virtual object, from start of the counting in the timer period to end of the counting, wherein the game processing includes a plurality of stages, and each of plurality of timer periods are adjustable, in specified time units, between at least a first time period and a second time period for each stage from the plurality of stages;

outputting a count image indicating a state of the counting by the counting processing and a game image by the game processing to a display unit;

calculating a score as a value obtained by scoring a result of predetermined processing performed in the game processing; and storing a high score in a memory for each timer period, from the plurality of timer periods, for each stage, from the plurality of stages, in the game processing, wherein the control of the virtual object is switchable between manual control based on a second user input on the user input unit, and automatic control in which control is performed without being based on the second user input, during the game processing, the electronic device includes a clock function, and while the electronic device is functioning as a clock, the electronic device shifts to a sleep mode if a predetermined time elapses, and when executing the counting processing, the electronic device does not shift to the sleep mode even if the predetermined time elapses.

13. The electronic device of claim 1, wherein the count image is displayed to appear as integrated with the game image and substantially covering a portion of the game image.

14. The electronic device of claim 1, wherein the count image changes display form as the game processing enters an end of timer period phase.

15. The non-transitory computer-readable storage medium of claim 11, wherein the processor of the electronic device is further caused to provide execution comprising:

restricting a user input for operating the virtual object, from a predetermined time before the counting in the timer period ends; and in association with the counting in the timer period ending, executing displaying a predetermined representation accompanying the end.

16. The method of claim 12, further comprising:

restricting a user input for operating the virtual object, from a predetermined time before the counting in the timer period ends; and in association with the counting in the timer period ending, executing displaying a predetermined representation accompanying the end.

\* \* \* \* \*